(12) United States Patent
Yokoi et al.

(10) Patent No.: US 9,002,958 B2
(45) Date of Patent: *Apr. 7, 2015

(54) PERFORMANCE MANAGEMENT SYSTEM USING UNSOLICITED FEEDBACK

(75) Inventors: Yumiko Christine Yokoi, San Francisco, CA (US); Nancy V. Lang, Palatine, IL (US); Justin Craig Field, Bellevue Hill (AU); Andrew Philip Gillibrand, Berkshire (GB); Hiteshbhai D. Shah, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 697 days.

This patent is subject to a terminal disclaimer.

(21) Appl. No.: 13/149,568

(22) Filed: May 31, 2011

(65) Prior Publication Data

US 2012/0311047 A1   Dec. 6, 2012

(51) Int. Cl.
*G06F 15/16*   (2006.01)
*G06Q 10/00*   (2012.01)

(52) U.S. Cl.
CPC ..................................... *G06Q 10/00* (2013.01)

(58) Field of Classification Search
None
See application file for complete search history.

(56) References Cited

U.S. PATENT DOCUMENTS

| | | |
|---|---|---|
| 5,727,950 A | 3/1998 | Cook et al. |
| 5,862,223 A | 1/1999 | Walker et al. |
| 6,527,556 B1 | 3/2003 | Koskinen |
| 6,829,585 B1 | 12/2004 | Grewal et al. |
| 6,871,195 B2 | 3/2005 | Ryan et al. |
| 7,120,647 B2 | 10/2006 | Venkatesh et al. |
| 7,769,624 B1 | 8/2010 | Armentano |
| 2002/0077884 A1 | 6/2002 | Sketch |
| 2002/0184085 A1* | 12/2002 | Lindia et al. .................... 705/11 |

(Continued)

FOREIGN PATENT DOCUMENTS

WO    WO2010054370 A1    5/2010

OTHER PUBLICATIONS iMentor Interactive, obtained at http://www.imentor.org/imentor-interactive; Dec. 9, 2010; 1 page.

(Continued)

*Primary Examiner* — Mohamed Ibrahim
(74) *Attorney, Agent, or Firm* — Trellis IP Law Group, PC (57) ABSTRACT

A system and method for designating or tagging an electronic message, such as an email that includes feedback about an employee's performance. The tagged email can then be automatically embedded within, or otherwise associated with, a performance management document such as a performance review. An example method includes providing a user interface display screen, whereby a user may view contents of an electronic message; providing a first user option, in association with the user interface display screen, to selectively designate the electronic message for a predetermined purpose and providing a signal in response thereto; and associating the electronic message with a document in response to the signal in accordance with a designation of the electronic message. In a specific embodiment, the designation of the electronic message includes a feedback designation, such that the electronic message is designated as a feedback message. The feedback message represents unsolicited feedback. The step of associating includes embedding the electronic message in the document, which may include a performance review document.

15 Claims, 6 Drawing Sheets

(56) References Cited

U.S. PATENT DOCUMENTS

| | | | |
|---|---|---|---|
| 2003/0101091 A1* | 5/2003 | Levin et al. | 705/11 |
| 2005/0021391 A1* | 1/2005 | Lu et al. | 705/11 |
| 2005/0091095 A1 | 4/2005 | Wilbrink et al. | |
| 2006/0031087 A1 | 2/2006 | Fox et al. | |
| 2006/0173824 A1* | 8/2006 | Bensky et al. | 707/3 |
| 2007/0244743 A1* | 10/2007 | Vegliante et al. | 705/11 |
| 2008/0114838 A1 | 5/2008 | Taylor | |
| 2010/0103779 A1 | 4/2010 | Kakirde et al. | |
| 2010/0114672 A1 | 5/2010 | Klaus et al. | |
| 2010/0198659 A1 | 8/2010 | Meltzer et al. | |
| 2011/0320478 A1* | 12/2011 | Carlson et al. | 707/769 |

OTHER PUBLICATIONS

National Mentoring Partnership; obtained at http://www.mentoring.ca.gov/pdf/e-mentor_facesheet.pdf; downloaded circa Dec. 9, 2010; 2 pages.

Priest, Curtiss W.; "Building Worldwide Mentoring Tools: Content Analysis of Visited Web Page and Matching"; Aug. 21, 2002; 4 pages.

Taleo Performance—Large Enterprise Employee Performance Management; obtained at http://www.taleo.com/ solutions/taleo-enterprise-performance; May 31, 2011; 2 pages.

Blue/360—Help Your Employees Develop More Fully; obtained at http://www.explorance.com/prod_360.asp?gclid=CIzTh66OhqkCFQImbAodgR8cpw; May 31, 2011; 1 page.

* cited by examiner

PERFORMANCE MANAGEMENT SYSTEM USING UNSOLICITED FEEDBACK

CROSS REFERENCES TO RELATED APPLICATIONS

This application is related to the following application, U.S. patent application Ser. No. 13/114,596, entitled SYSTEM PROVIDING AUTOMATED FEEDBACK REMINDERS, filed on May 24, 2011, which is hereby incorporated by reference, as if set forth in full in this specification for all purposes.

This application is further related to the following application, U.S. patent application Ser. No. 13/149,593, entitled SYSTEM USING FEEDBACK COMMENTS LINKED TO PERFORMANCE DOCUMENT CONTENT, filed on May 31, 2011, which is hereby incorporated by reference, as if set forth in full in this specification for all purposes.

BACKGROUND

The present application relates to software and more specifically to communications applications that facilitate diverting, tagging, or otherwise associating messages for predetermined purposes.

Systems and methods for handling electronic communications messages are employed in various demanding applications, including client software for receiving and filtering Short Message Service (SMS) text messages, Internet Relay Chat (IRC) messages, conventional email messages, and so on. Such applications often demand feature rich clients with tools for effectively filtering, filing, or otherwise handling messages.

Efficient mechanisms for effectively filtering or filing messages are particularly important in enterprise implementations, where each message may be relevant to a particular business operation, process, task, goal, and so on. Methods for effectively organizing incoming messages may facilitate certain enterprise tasks that are related to incoming or outgoing messages.

Conventionally, messaging clients, such as Microsoft Outlook Express, may provide features or tools for filtering messages or filing messages in particular folders. However, such applications typically lack more in depth features for facilitating organizing messages for use by other enterprise processes, documents, and so on.

Methods for handling messages pertaining to enterprise-personnel performance feedback can be particularly useful for enterprises that periodically rate enterprise personnel based, in part, on feedback associated therewith. Conventionally, received email messages, which may constitute feedback, are maintained in an email client folder. During a performance review, access to the feedback may require time-consuming search of the client folder for relevant messages.

SUMMARY

An example method for designating or tagging an electronic message includes providing a user interface display screen whereby a user may view contents of an electronic message; providing a first user option, in association with the user interface display screen, to selectively designate the electronic message for a predetermined purpose and providing a signal in response thereto; and associating the electronic message with a document in response to the signal in accordance with a designation of the electronic message.

In a more specific embodiment, the designation of the electronic message includes a feedback designation, such that the electronic message is designated as a feedback message. The feedback message may represent unsolicited feedback. The step of associating includes embedding the electronic message in a performance management document, which may include a performance review document. The performance review document may be associated with a recipient of feedback, i.e., the subject of the performance review document.

The example method further includes providing a second user option to select a portion of the particular electronic message and to designate the portion of the electronic message as feedback for association with the performance review document. A recipient or sender of an electronic message, such as an email message, may employ the user interface control to designate the electronic message or portion thereof as feedback to be automatically included in or linked to a performance evaluation document.

The novel design of certain embodiments discussed herein is facilitated by various mechanisms, such as user interface controls displayed in proximity to email messages, which allow unsolicited feedback to be associated with a performance evaluation document. Unsolicited feedback may be higher quality than solicited feedback. In general, unsolicited feedback may be more timely than solicited feedback, and it may more accurately represent a feedback giver's thoughts than if it were requested several months after the fact (during the performance evaluation cycle). Unsolicited feedback may generally be more authentic than solicited feedback, since the feedback is voluntary. Furthermore, certain embodiments discussed herein may reduce the need to sort through emails, print emails, and so on, in search of relevant feedback for inclusion in a performance evaluation document.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while embodiments are discussed herein with respect to methods and accompanying user interfaces for selectively allocating email messages as feedback to be included in an enterprise employee performance evaluation document, embodiments are not limited thereto. For example, any electronic message, such as a text message, Internet blog entry, and so on, may be automatically tagged or associated with a particular type of content and then automatically incorporated into or linked with virtually any type of document, without departing from the scope of the present teachings.

Furthermore, while embodiments are discussed herein with respect to an enterprise application pertaining to performance management, embodiments are not limited thereto. For example, content organization and linking methods discussed herein may be employed in various applications other than enterprise applications, where improved ability to organize content in a document or user interface is desired.

For the purposes of the present discussion, an enterprise may be any organization of persons, such as a business, university, government, military, and so on. The terms "organization" and "enterprise" are employed interchangeably herein. Personnel of an organization or enterprise, i.e., enterprise personnel, may include any persons associated with the organization, such as employees, contractors, board members, and so on. The terms "employee" or "employees" and "enterprise personnel" are employed interchangeably herein. For example, an enterprise employee, or simply employee, may be any person associated with an organization, such as a worker, manager, executive, contractor, or other person who may be subject to being rated via a performance document.

For the purposes of the present discussion, a document may be any collection of information, which may include one or more virtual files (as opposed to a printed hard copy of a file) and/or computing objects. A document need not be represented as a single file, but may include, for example, files linked together and accessible via a common interface, such as via an HyperText Markup Language (HTML) web page or file or via an eXtensible Markup Language (XML) page or file. A performance review document, also called a performance evaluation document or performance report, may be any document that is adapted to specifically contain or reference information pertaining to the performance and/or behavior of an employee or other enterprise personnel over a predetermined time interval.

For the purposes of the present discussion, feedback is considered to be a type of information, which includes any information or input regarding the performance of one or more tasks, behaviors, and so on. Feedback may include, for example, advice given to a person (e.g., employee) pertaining to a particular task, comments pertaining to a particular competency, input pertaining to tasks associated with a certain goal, advice pertaining to future or past performance, goals, aspirations, and so on.

A feedback message may be any message, such as an electronic message, which includes feedback information, or which is otherwise designated as constituting feedback. Hence, a feedback message may include advice, criticism, praise, instruction, and/or other input pertaining to a task, behavior, or other activity performed by a recipient of the feedback. For example, a manager may send a feedback message to a subordinate employee praising the employee for success in achieving a particular goal with in a predetermined time interval. A mentor may provide an instructional feedback message commenting as to how a particular mentee may improve performance pertaining to a particular task, and so on.

Unsolicited feedback may be any feedback that is not provided in direct response to a specific request for feedback. Note that conventionally, enterprise systems for managing feedback typically only categorize or organize feedback that is generated in response to a specific request made by a feedback recipient. Generally, enterprise systems lack effective mechanisms for managing or organizing feedback that is not made in response to a specific feedback request made via special feedback applications and user interfaces.

An electronic message may be any communication sent or stored electronically, such as via a computer. A communication may be any portion of information, such as a note, document, and so on. Examples of electronic messages include emails and/or associated attachments or portions thereof, text messages, instant messages sent via Internet Relay Chat (IRC), and so on.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
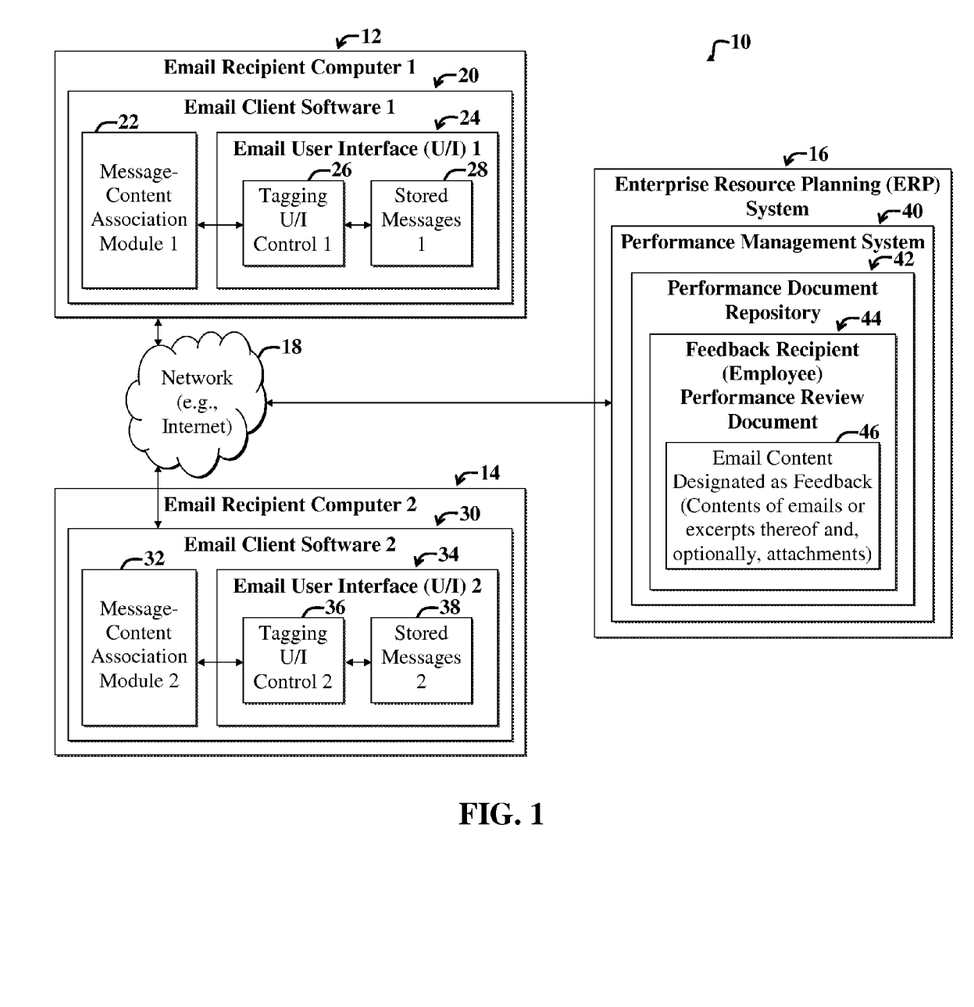
FIG. 1 is a diagram of a first example embodiment of a system for facilitating associating an electronic message with a performance review document for an enterprise employee or other personnel.

FIG. 1 is a diagram of a first example embodiment of a system 110 for facilitating associating an electronic message with a performance review document 44 for an enterprise employee or other personnel. The example system 10 includes a first email recipient computer 12 and a second email recipient computer 14 in communication with an Enterprise Resource Planning (ERP) system 16 via a network 18, such as the Internet.

The first example email recipient computer 12 runs a first instance of email client software 20, such as a modified version of Outlook, Web Mail, etc. The email client software 20 includes a message-content association module 22 in communication with a first email client user interface module 24. The first email client user interface 24 includes a first tagging user interface control module 26, which displays associated user interface controls when email messages 28 are displayed via the first user interface module 24.

The second email recipient computer 14 includes various modules 30-38, which are arranged and operate similarly to the modules 20-28 of the first email recipient computer, respectively.

The example ERP system 16 includes a performance management system 40, which includes a performance document repository 42. The performance document repository 42, also called an employee evaluation document repository, includes an example performance review document 44, also called a performance evaluation document or performance report. The example performance review document 44 includes a collection of email content 46, which has been collected from emails sent and/or received by enterprise personnel using email clients, such as the client computers 12, 14, to send and/or receive emails. The collected email content 46 has been marked (also called designated) as feedback by recipients or senders of the email messages and associated content.

In an example operative scenario, the user of the first email client computer 12 opens one of the stored email messages 28 via the first email user interface 24. A tagging user interface control, such as a button, is generated for display by the first tagging user interface control module 26. The tagging user interface control is displayed near the resulting displayed email message. The user then selects the tagging user interface control, as discussed more fully below, to activate additional user interface controls via the first tagging user interface control module 26.

The additional user interface controls are adapted to enable the first user to designate the opened (or otherwise selected) email message as a feedback message. When the user designates the email message as a feedback message, a resulting signal activates first the message-content association module 22, which lodges a copy of the email message, or selected portion thereof, in the performance review document among the email content 46. The email content 46 is also simply called feedback or notes derived from email. Alternatively, the message-content association module 22 automatically edits the email content 46 (i.e., designated feedback) of the performance review document 44 to include links, such as hyperlinks, to the selected one of the email messages 28 or selected portions thereof.

The email user interfaces 24, 34 may include computer code for providing one or more user options for identifying a preexisting performance review document for which to associate designated feedback (e.g., email content 46). In addition, a user may employ the email user interfaces 24, 34 to describe or specify a future (not yet created) performance review document for which to associate email content. When a performance review document matching the description is later created, the resulting performance review document may be automatically adjusted to included designated feedback (e.g., email content 46). In addition, the email user interfaces 24, 34 may provide user options for triggering creation of a performance review document (for which to associate email content) in accordance with user-specified parameters. Alternatively, selection of preexisting or future performance review document(s) for associating with email content is automatically performed via predetermined computer code running on the message-content association module 22, 32. Hence, the association of email content (e.g., feedback) with a performance review document does not require a preexisting performance review document. Feedback can be associated with one or more future performance review documents, i.e., "future" associations can be created or specified.

Note that in certain embodiments, a user may simultaneously select multiple email messages for association with the performance review document 44. In addition, user interface controls generated by the first tagging user interface control module 26 may include additional controls for enabling a user to supply additional tags to an email message, which may facilitate searching for, organizing, or otherwise handling email content. Those skilled in the art will appreciate that the designation or tagging of particular email content may be implemented via metadata, and XML may be used to link functionality between the ERP system 16 and the client computers 12, 14 via the network 18.

In the present example operative scenario, the stored email message opened by the first user of the first email recipient computer 12 represents an email message that has been received by the first user and which contains feedback pertaining to the first user. In this case, first user (or performance thereof) is the subject of the performance review document 44. Alternatively, the selected email message may be an outgoing message to be sent by the first user to a second user of the second email recipient computer 14, where the email content includes feedback pertaining to the second user. Alternatively, the selected email message represents an email either to be sent to the second user or which has been received by the first user from the second user, but pertains to feedback given to a third user (not shown), who is the subject of the performance review document 44. Hence, the feedback in a given email message need not pertain to a particular sender or recipient of the email message.

Hence, an email may be designated as feedback by a sender as pertaining to a given recipient; by a recipient pertaining to the recipient; or by a recipient or sender pertaining to a third party, where the third party is other than the sender or recipient of the email message being designated as feedback for inclusion in the performance review document 44. In addition, designation of an email message as feedback involves assigning or otherwise associating an entire message or a portion thereof as feedback via one or more user interface controls generated via the first tagging user interface control module 26 and accompanying message-content association module 22.

In summary, after designation as feedback, the message-content association module 22 copies selected email content comprising feedback into the performance review document 46. The content is said to be embedded in and associated with the performance review document 44 pertaining to an employee feedback recipient who is subject of the performance review document 44.

Those skilled in the art with access to the present teachings may readily implement the various modules 20-28 of the email client software 20, such as via plug-ins or add-ons, without undue experimentation.

Figure 2:
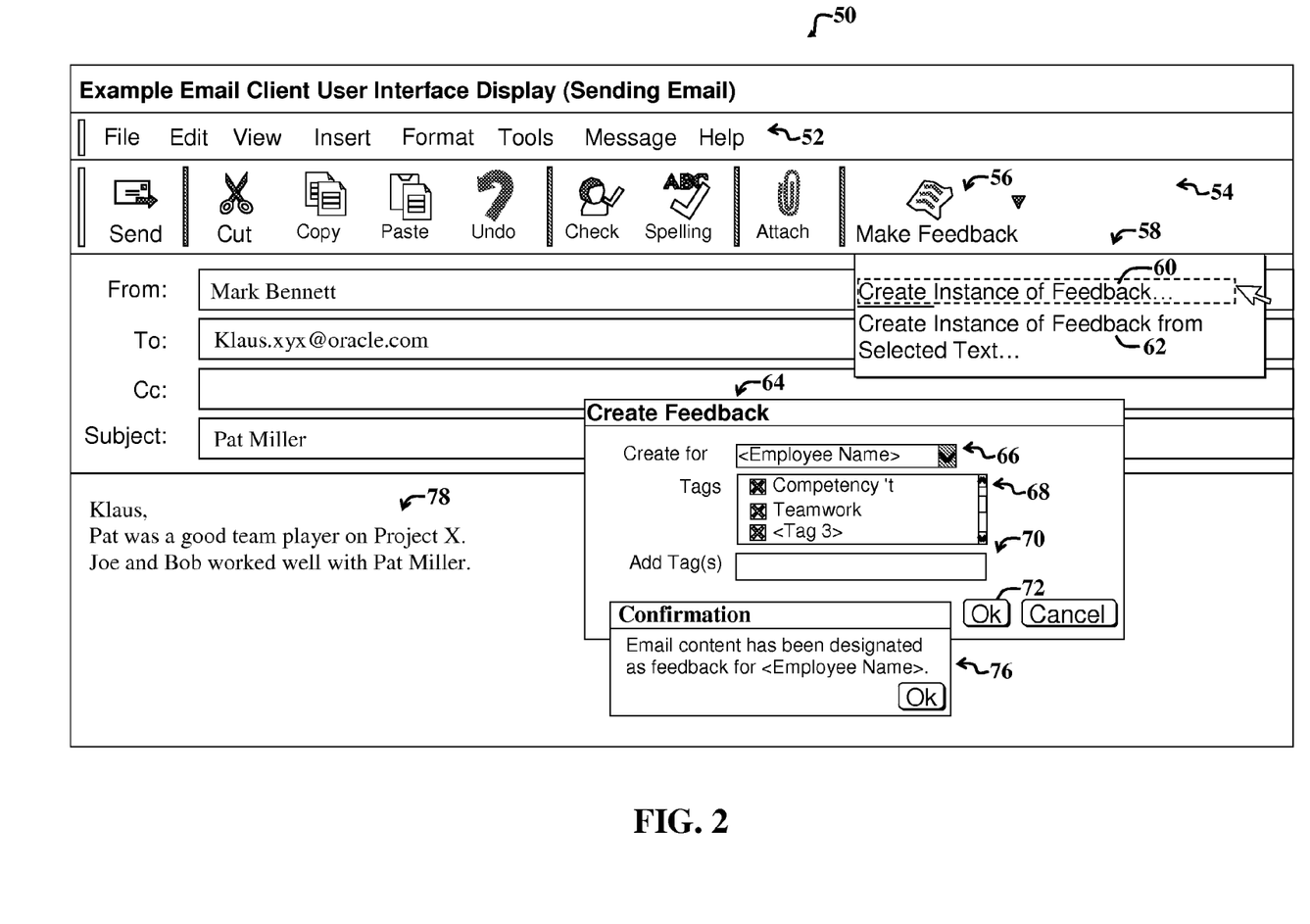
FIG. 2 is a diagram of a first example user interface display screen of an email client that is adapted for use with the system of FIG. 1 and includes user interface controls for associating email with a performance review document for inclusion as feedback therein.

FIG. 2 is a diagram of a first example user interface display screen 50 of an example email client that is adapted for use with the system 10 of FIG. 1 and includes user interface controls 56-76 for associating an outgoing email message 78 with a performance review document, such as the document 44 of FIG. 1, for inclusion as feedback therein.

The example user interface display screen includes a menu bar 52 with various standard menus, e.g., file, edit, view, insert, format, tools, and so on. A tool bar with various button icons 54 is positioned below the menu bar 52. In general, the user interface display screen 50 may be implemented via a conventional email client, such as via Microsoft Outlook Express, which has been adjusted to include functionality corresponding to the make-feedback button 56 and associated drop-down menu 58 and dialog boxes 64, 76.

The present example user interface display screen 50 represents an email written by and being sent from a first employee (Mark Bennett) to a second employee (Klaus). Email content 78 discusses a third employee (Pat Miller), who is subject to a performance evaluation process.

In the present example operative scenario, the first employee, Mark Bennett decides to mark the outgoing email content 78 to be sent to the second employee, Klaus, as feedback pertaining to Pat Miller. Accordingly, the user Mark selects the make-feedback button icon 56, which then activates a corresponding drop-down menu 60. The example drop-down menu 60 includes various selectable options, including a first option 60 to designate all of the email content 78 as feedback. A second option 62 enables the user Mark to selectively designate a portion of the email content 78 as feedback by first highlighting a particular portion of the email content 78, and then selecting the second user option from the drop-down menu 62. Note that alternatively, Mark could choose a previously sent email (for feedback designation) as opposed to an outgoing email (i.e., email to be sent).

Upon selection of the first option 60 or the second option 62 from the make-feedback drop-down menu 58, a create-feedback dialog box 64 appears. For the purposes of the present discussion, a dialog box may be any computer-generated graphical representation that includes one or more displayed mechanisms that are responsive to user input.

The create-feedback dialog box 64 includes a drop-down menu 66 enabling a user to select, i.e., designate, which employee (e.g., Pat Miller) the feedback will pertain to. Additional tags may be associated with the content via selection of one or more tags from a list of tags 68. Additional tags, such as labels, may be associated with the email content 78. The tags may facilitate search operations for particular content, e.g., content occurring in a performance review document.

Examples of tags include competency and teamwork tags. Such tags may facilitate organizing a feedback message within a performance review document in accordance with the tags. When an email message or portion thereof is designated as a feedback message in combination with one or more tags being applied thereto, the email message or portion thereof is said to be assigned multiple designations. For example, the selected email content 96 is designated as not only being feedback but as pertaining to competency and teamwork.

A user may enter additional tags (and then press an enter key or the Ok button 72) in an add-tags field 70. Upon selecting the Ok button 72, an optional confirmation dialog box 76 appears. In the present example scenario, the additional dialog box 76 confirms to the user Mark Bennett that the email content 78 has been designated as feedback pertaining to Pat Miller for inclusion in a performance evaluation document pertaining to a performance review of Pat Miller and his past performance while working at a particular enterprise.

Figure 3:
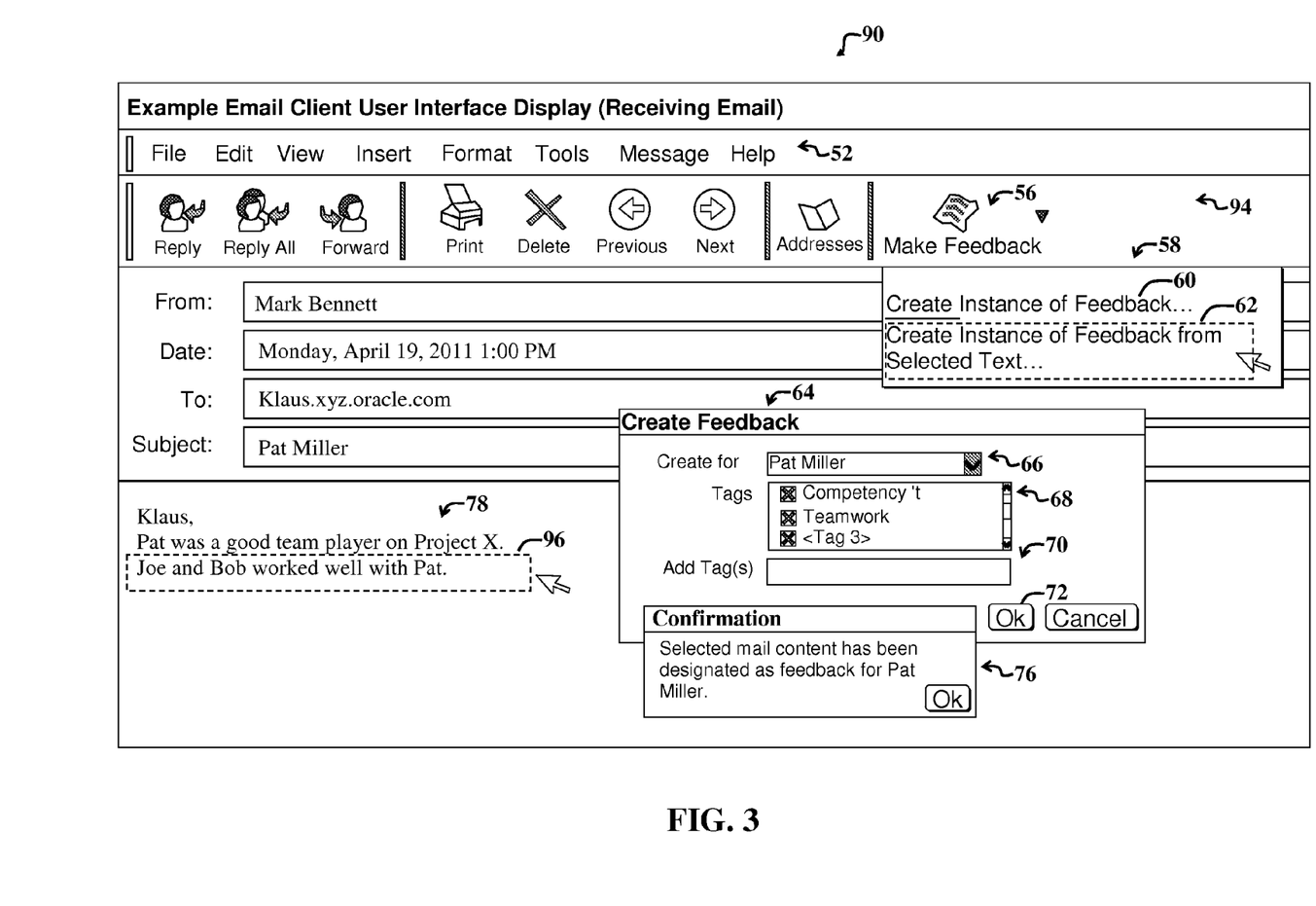
FIG. 3 is a diagram of a second example user interface screen of an email client that is adapted for use with the system of FIG. 1 and includes user interface controls for associating incoming email with a performance review document for inclusion as feedback therein.

FIG. 3 is a diagram of a second example user interface screen 90 of an email client that is adapted for use with the system 10 of FIG. 1 and includes user interface controls 56-76 for associating content from incoming email message 78 with a performance review document for inclusion as feedback therein.

The construction and operation of the second example user interface display screen 90 is similar to the construction and operation of the first example user interface display screen 50 of FIG. 2 with the exception that the second user interface display screen is adapted to display a received email message as opposed to facilitate constructing an outgoing email message. For example, the set of button icons 94 displayed and accessible via the second user interface display screen 52 are different than the set of buttons and icons 54 of the first user interface display screen 50 of FIG. 2, with the exception of the make-feedback button icon 56 and associated user interface controls 58-76.

In the present example operative scenario, Klaus has received email content 78 from Mark Bennett, a portion 96 of which is considered, by Klaus, to constitute feedback pertaining to Pat Miller. Klaus selects the portion 96, such as by highlighting the portion 96, and then subsequently selects the make-feedback button icon 56 to activate the accompanying drop-down menu 58. Klaus then selects the second option 62 from the drop-down menu to associate the portion 96 (as opposed to the entire email message content 78) with Pat Miller's performance review document and for inclusion as feedback therein. The selected portion 96 is said to represent an instance of feedback or portion thereof.

Hence, the email content 78 is being opened and read by Klaus, who has decided to designate the particular portion 96 of Mark Bennett's email 78 as feedback to be included in a performance review document associated with Pat Miller.

Figure 4:
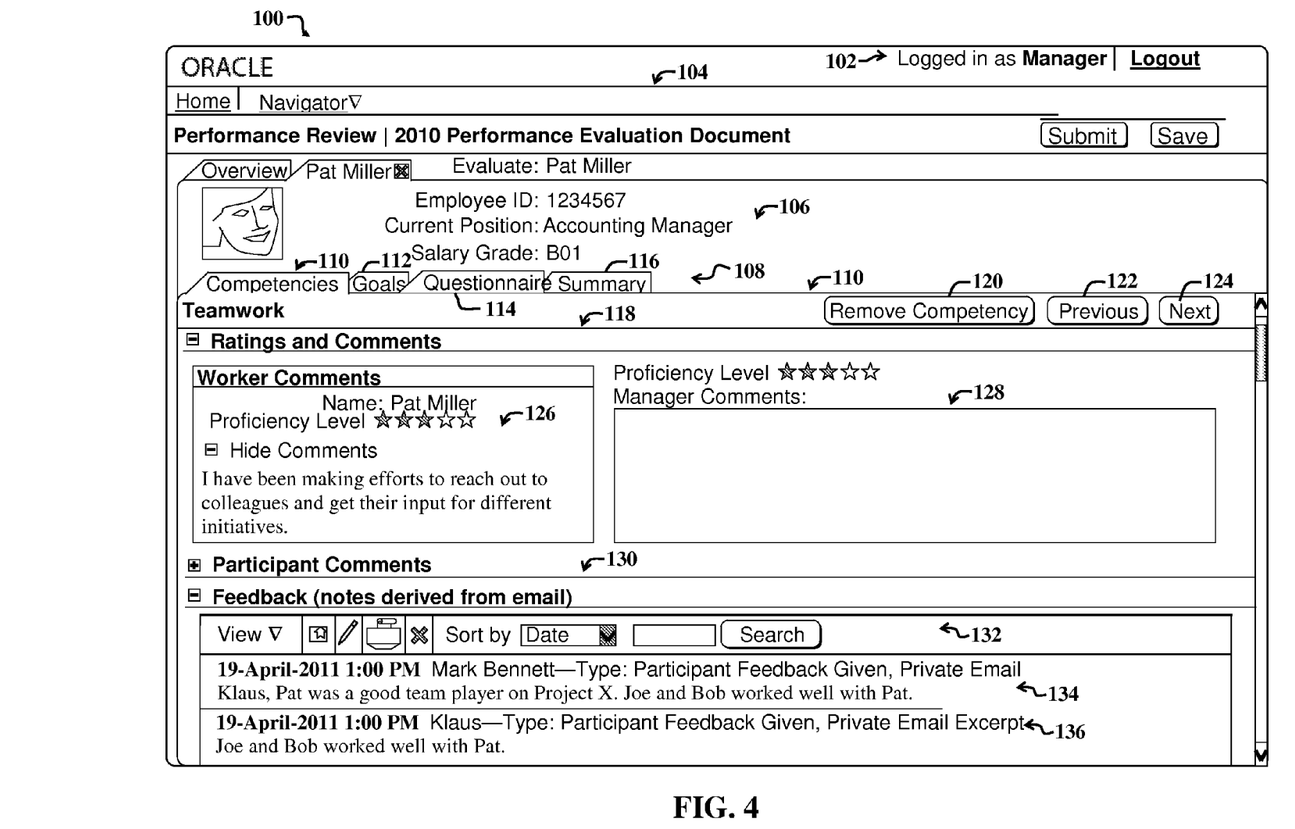
FIG. 4 is a diagram of a third example user interface display screen depicting an example performance review document, which includes feedback provided in response to user manipulation of the user interface display screens of FIGS. 2-3.

FIG. 4 is a diagram of a third example user interface display screen 100 depicting an example performance review document 104, which includes feedback 134, 136 provided in response to user manipulation of the user interface display screens of FIGS. 2-3.

In the present example embodiment, third example user interface display screen 100 is used by a manager (e.g., as indicated via a login information section 102) to review and/or edit Pat Miller's performance evaluation (also called performance review) document 104. Note that while the person viewing the performance evaluation document 104 is indicated as "Manager," the manager may be Klaus or another person with permissions or access privileges to view the document 104. The document 104 includes employee-identification information 106, which is positioned above various tabs 108 corresponding to different sections of the performance review document 104.

The tabs include a goals tab 112, a questionnaire tab 114, a summary tab 116, and the currently shown competencies tab 110. The competencies tab 110 includes user interface controls 120-124 for removing a particular competency, such as teamwork; for shifting the display to a subsequent competency, e.g., via a next button 124, or shifting the display to a previous competency, e.g., via a previous button 122.

The competencies tab 110 currently shows a teamwork sub-section 118, wherein teamwork represents a particular competency. Competency represents an information category, which in the present example embodiment, corresponds to one of the tags 68 of FIGS. 2-3, which were applied to the email content that was designated as feedback.

The teamwork sub-section 118 includes a worker-comment section 126 for displaying comments or statements by the person (Pat Miller) who is subject of the performance evaluation document 104. A manager-comment section 128 provides user interface controls for enabling a manager to make comments pertaining to the reviewed employee (Pat Miller). A feedback section 130 includes a band of user interface controls 132, which are adapted to enable a manager to perform various actions, such as searches on feedback content 134, 136 included in the feedback section 130. The controls 132 are also adapted to enable a manager or other authorized reviewer to sort, print, and edit feedback content. Note that user-created tags that have been assigned to particular feedback may be entered as search terms in a search field of the controls 132. However, search functionality provided by the controls 132 is not limited to searching based on tags, but may enable searching for terms present in the feedback or other characteristics of the feedback, such as when the feedback was created.

The feedback content 134, 136 includes email messages or excerpts thereof, which have been designated as feedback via one or more of the embodiments of FIGS. 1-3.

Figure 5:
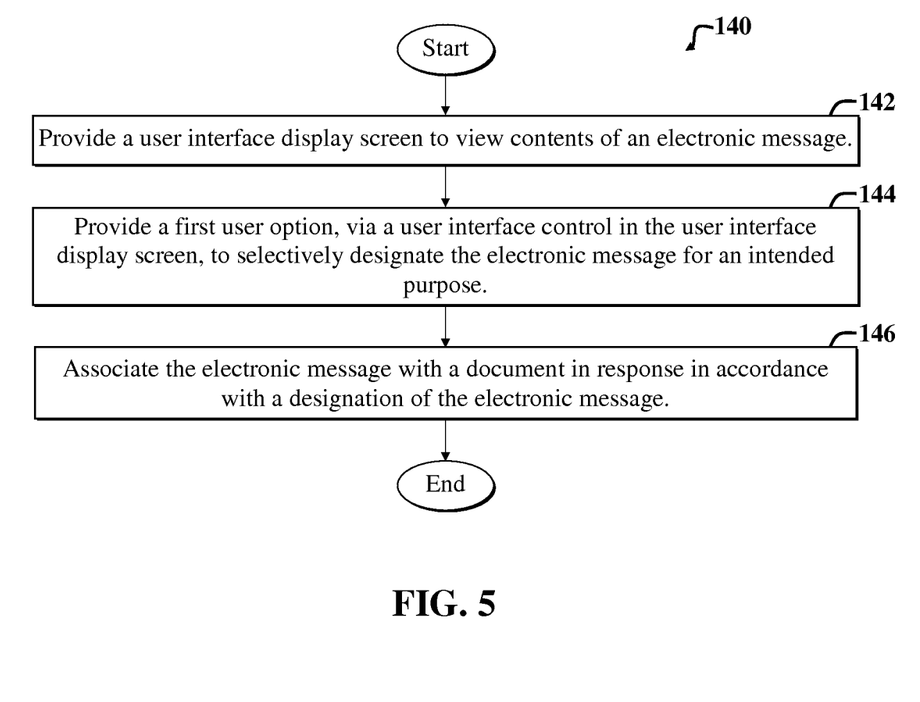
FIG. 5 is a flow diagram of first example method adapted for use with the embodiments of FIGS. 1-4.

FIG. 5 is a flow diagram of first example method 140 adapted for use with the embodiments of FIGS. 1-4. The example method 140 represents a method for method for designating or tagging an electronic message. The example method includes a first step 142, which includes providing a user interface display screen whereby a user may view contents of an electronic message, such as an email message.

A second step 144 includes providing a first user option, in association with the user interface display screen, to selectively designate the electronic message for an intended purpose and providing a signal in response thereto. A user option is said to be "in association with" a user interface display screen if one or more user interface controls providing the user option are displayed concurrently with or are otherwise made accessible via the user interface display screen.

A third step 146 includes associating the electronic message with a document in response to the signal in accordance with a designation of the electronic message.

Figure 6:
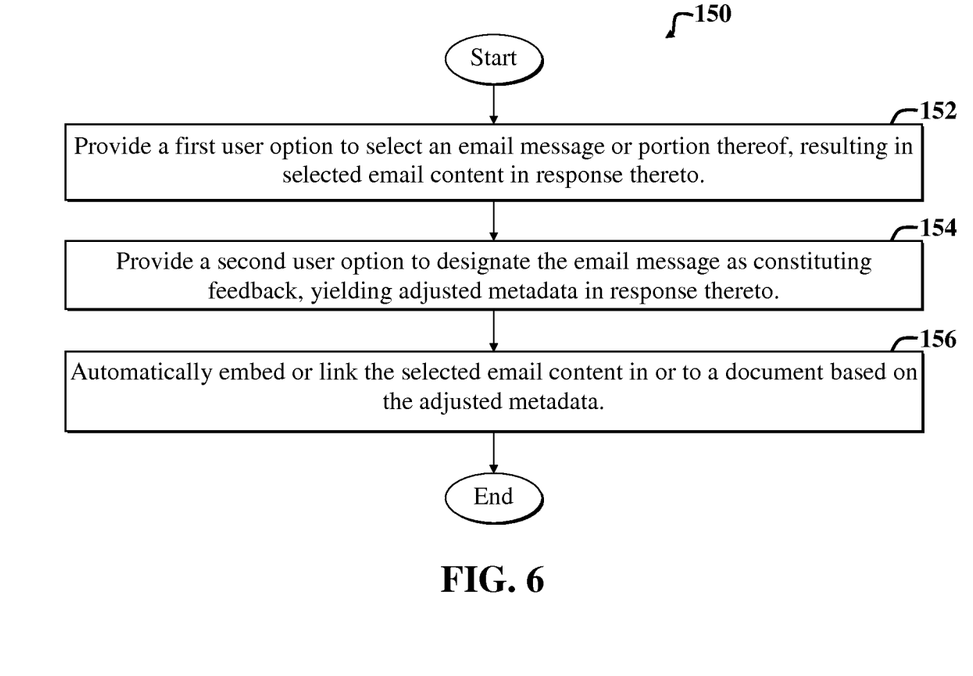
FIG. 6 is a flow diagram of a second example method adapted for use with the embodiments of FIGS. 1-4.

FIG. 6 is a flow diagram of a second example method 150 adapted for use with the embodiments of FIGS. 1-4. The method 150 represents a method for adjusting metadata associated with email content. The example method includes an initial selection step 152, which includes providing a first user option to select an email message or portion thereof, resulting in selected email content in response thereto.

A subsequent designating step 154 includes providing a second user option to designate the email message as constituting feedback, yielding adjusted metadata in response thereto.

Next, a linking step 156 includes automatically embedding or linking the selected email content in or to a document based on the adjusted metadata.

Hence, certain embodiment disclosed herein may enable employees and managers to take advantage of naturally occurring day-to-day feedback that is frequently provided by others as part of the normal course of business. In the course of daily work, people are often sending feedback to one another concerning work in the form of emails giving praise, or thanking someone for their support on an issue, or conveying that they should have taken a different approach to a problem, or suggesting that they (for example) do a better job at managing their time.

With certain embodiments discussed herein, users can take this unsolicited feedback that they receive via email on a day-to-day basis and easily designate it to be considered as performance feedback. Based on this designation, the underlying system will associate the email feedback to the user's performance evaluation document. At the time of the performance evaluation cycle, the user will have full access to the different feedback that s/he received throughout the year from various people, right in the performance document user interface. Thus the user can easily refer to the feedback while reflecting on her/his accomplishments during the year without additional effort.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer, for processing an email message to provide feedback related to a particular person in to a group of persons associated with an enterprise, wherein the email message includes a comment on workplace performance of the particular person in the group, the method comprising:
   displaying, by the computer system, contents of a received email message or an email message to be sent on a user interface display, displayed on a display screen, of an email client, where the user interface display includes a feedback control and a tag control;
   selectively designating, by the computer system and in response to input signals to the feedback control, selected text included in displayed contents of the email message as performance feedback information relating to the particular person;
   tagging, by the computer system and in response to input signals to the tag control, the performance feedback information as competency feedback information or teamwork feedback information; and
   associating, by the computer system and in response to user input, tagged selected text of the email message designated as performance feedback information with a performance management document associated with the particular person.

2. The method of claim 1 further including providing a user option to assign multiple designations to the selected text, wherein the multiple designations include a designation as feedback.

3. The method of claim 2 further including associating, by the computer system, the selected text with a performance report in response to the designation of contents of the selected text as performance feedback information.

4. The method of claim 3 wherein the performance report pertains to performance of a recipient of the email message.

5. The method of claim 4 wherein the performance report includes a performance review document.

6. The method of claim 5 further including:
   displaying, in response to user input and by the computer system, contents of the performance review document and providing a user option to search for one or more particular electronic messages having contents that have been designated as performance feedback information.

7. The method of claim 1 wherein associating includes embedding, by the computer system, the performance feedback information in the performance management document.

8. The method of claim 7 wherein the performance management document includes a performance review document.

9. The method of claim 8 further including automatically linking, by the computer system, the performance feedback information to the performance review document in response to designation of the selected text as feedback or in response to association of the performance feedback information with the performance review document.

10. The method of claim 9 further including automatically embedding, by the computer system, the performance feedback information in the performance review document.

11. The method of claim 1 wherein the performance feedback information represents unsolicited feedback.

12. The method of claim 2 wherein the multiple designations includes a designation identifying one or more particular persons in the group of persons to be associated with the email message.

13. The method of claim 2 wherein the multiple designations include a designation identifying the email message as associated with a particular information category.

14. An apparatus for processing an email message to provide feedback related to a particular person in a group of persons associated with an enterprise, wherein the email message includes a comment on workplace performance of the particular person in the group, the apparatus comprising:
 a digital processor coupled to a display screen and to a processor-readable storage device, wherein the processor-readable storage device includes one or more instructions executable by the digital processor to perform the following acts:
 displaying contents of a received email message or an email message to be sent on a user interface display, displayed on a display screen, of an email client, where the user interface display includes a feedback control and a tag control;
 selectively designating, in response to input signals to the feedback control, selected text included in displayed contents of the email message as performance feedback information relating to the particular person;
 tagging, in response to input signals to the tag control, the performance feedback information as competency feedback information or teamwork feedback information; and
 associating, in response to input signals, tagged selected text of the email message designated as performance feedback information with a performance management document associated with the particular person.

15. A non-transitory processor-readable storage device including instructions executable by a digital processor for processing an email message to provide feedback related to a particular person in a group of persons associated with an enterprise, wherein the email message includes a comment on workplace performance of the particular person in the group, the non-transitory processor-readable storage device including one or more instructions for:
 displaying contents of a received email message or an email message to be sent on a user interface display, displayed on a display screen, of an email client, where the user interface display includes a feedback control and a tag control;
 selectively designating, in response to input signals to the feedback control, selected text included in displayed contents of the email message as performance feedback information relating to the particular person;
 tagging, in response to input signals to the tag control, the performance feedback information as competency feedback information or teamwork feedback information; and
 associating, in response to user input signals, tagged selected text of the email message designated as performance feedback information with a performance management document associated with the particular person.

* * * * *

UNITED STATES PATENT AND TRADEMARK OFFICE
CERTIFICATE OF CORRECTION

PATENT NO.        : 9,002,958 B2
APPLICATION NO.   : 13/149568
DATED             : April 7, 2015
INVENTOR(S)       : Yokoi et al.

Page 1 of 1

It is certified that error appears in the above-identified patent and that said Letters Patent is hereby corrected as shown below:

In the Claims

In column 10, line 22, in claim 1, delete "to a" and insert -- a --, therefor.

In column 12, line 32, in claim 15, delete "user input" and insert -- input --, therefor.

Signed and Sealed this
Third Day of November, 2015

Michelle K. Lee
*Director of the United States Patent and Trademark Office*